United States Patent [19]
Archer

[11] Patent Number: 5,725,083
[45] Date of Patent: Mar. 10, 1998

[54] STRIP BLADE CONVEYOR BELT CLEANER

[75] Inventor: Richard A. Archer, Paducah, Ky.

[73] Assignee: Arch Environmental Equipment, Inc., Paducah, Ky.

[21] Appl. No.: 762,456

[22] Filed: Dec. 9, 1996

[51] Int. Cl.$^6$ .................................................. B65G 45/16
[52] U.S. Cl. .................................. 198/499; 198/497
[58] Field of Search .................................. 198/497, 499

[56]          References Cited

U.S. PATENT DOCUMENTS

| 3,949,866 | 4/1976 | Pott | 198/499 |
| 4,324,327 | 4/1982 | Chouteau et al. | 198/497 |
| 4,696,388 | 9/1987 | Stoll | 198/499 X |
| 5,161,669 | 11/1992 | Gibson, Jr. | 198/499 |
| 5,570,774 | 11/1996 | Morin | 198/499 |

FOREIGN PATENT DOCUMENTS 1268488  11/1986  U.S.S.R. .................. 198/499

*Primary Examiner*—James R. Bidwell
*Attorney, Agent, or Firm*—Dorn, McEachran Jambor & Keating

[57]          ABSTRACT

A conveyor belt cleaner for cleaning one surface of a conveyor belt of length L and transverse width W includes a cleaner blade formed as an elongated strip of flexible elastomer, usually rubber or urethane. The blade, preferably of constant thickness, has a width much smaller than L and a length greater than W. The blade extends across the conveyor belt and has fasteners at its opposite ends. A tensioner, connected to one of the blade fasteners, applies a longitudinal tensioning force to the cleaner blade to maintain the cleaner blade in contact with the surface of the conveyor belt. In the preferred construction two tensioners are used, at opposite ends of the cleaner blade.

6 Claims, 2 Drawing Sheets

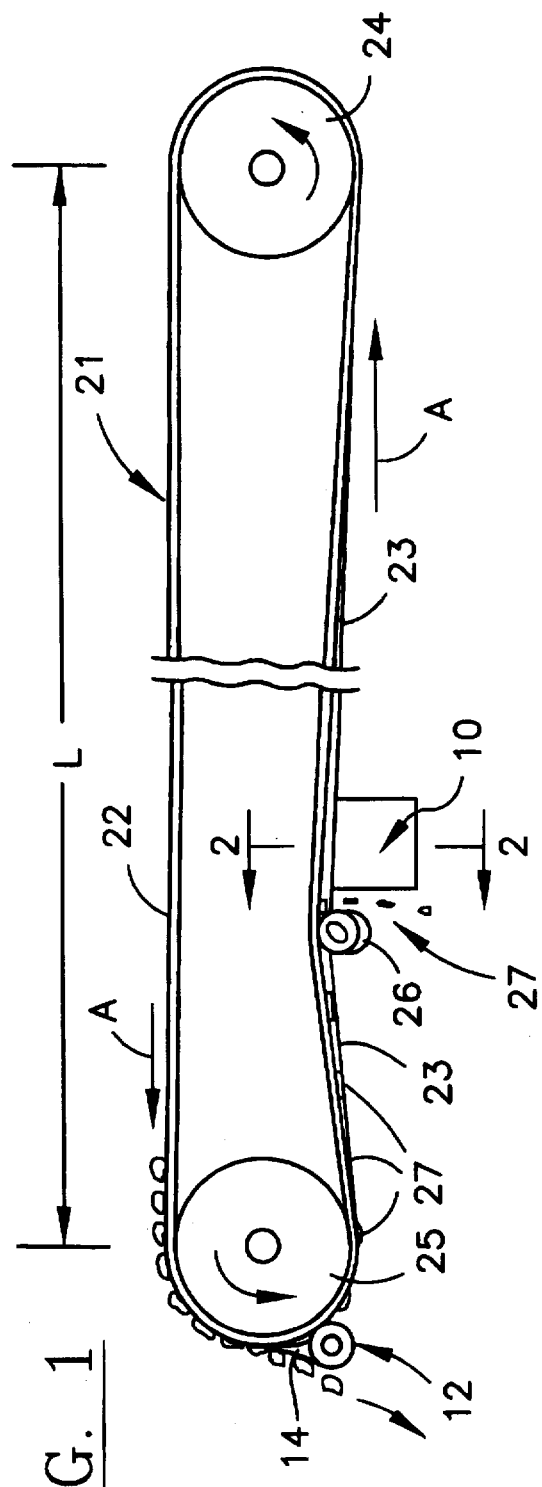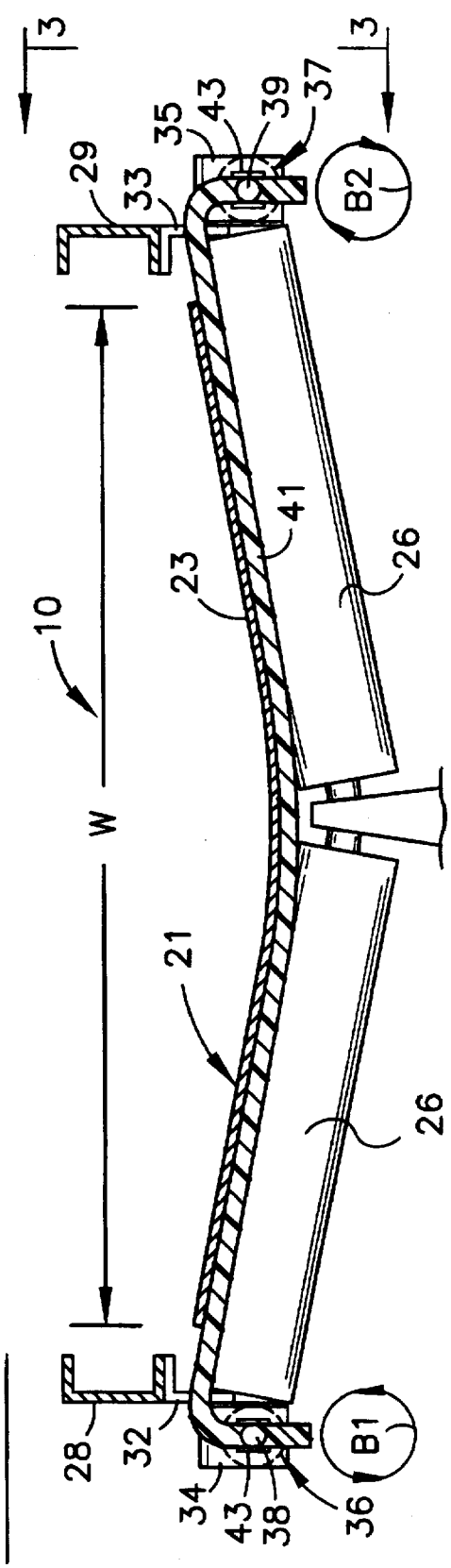

STRIP BLADE CONVEYOR BELT CLEANER

BACKGROUND OF THE INVENTION

Single-blade and multi-blade belt scrapers or cleaners are frequently used with belt conveyors in mining and mineral storage operations and in a wide variety of other applications. Single-blade cleaners (the blade may be formed of a plurality of abutting segments) are usually used in primary cleaners, scraping conveyed material from a part of the conveyor belt backed up by the head pulley. Other belt cleaners, usually referred to as secondary belt cleaners, are often positioned on the return run of the conveyor belt. They are employed to clean any residue clinging to the conveyor belt after the belt moves past the primary cleaner. For an example of a cleaner for a primary belt conveyor, see Gordon U.S. Pat. No. 5,222,589; a secondary conveyor belt cleaner is disclosed in Gordon U.S. Pat. No. 5,222,588. Both Gordon patents were issued Jun. 29, 1993.

Conveyor belt cleaners usually operate in an environment that can only be described as hostile. The working conditions are frequently wet, dirty, and often corrosive. Continuing maintenance activity is a necessity, due to inevitable wear on the cleaner blades, but is often rendered difficult by limited space for access and by the aforementioned adverse working conditions. In excessively wet or corrosive environments, maintenance is made more difficult by corrosion of metal mounting bolts, clamps, and the like. All of these difficulties are likely to be present in mining operations and in industrial conveyor belt applications.

In many belt cleaners the scraper blade must accommodate mechanical belt joints and clinging, localized accumulations. The cleaner blade should afford an effective, consistent scraping action despite extensive wear and frequent movement of belt joints (splices) through the cleaner. Corrosion should be precluded, along with effective shock protection. Overly compliant or excessively stiff blades should be avoided to preclude excessive vibration. These problems can be particularly difficult in a belt cleaner that cleans the return portion of the conveyor belt, cleaning any residue left by a primary cleaner.

SUMMARY OF THE INVENTION

It is an object of the invention, therefore, to provide a new and improved construction for a conveyor belt cleaner, particularly a secondary cleaner, and for cleaner blades usable in belt cleaners, that effectively eliminates or minimizes the problems discussed briefly above, while providing for extended operating life in a belt cleaner of minimum cost.

A specific object of the invention is to provide a new and improved belt cleaner and blade construction for secondary conveyor belt cleaning aimed at material which adheres to the surface of a conveyor belt, which conveyor belt surface may be flat transversely of the belt or may be V-shaped or of other transverse configuration.

In one aspect the invention relates to a conveyor belt cleaner for cleaning one surface of a conveyor belt, the conveyor belt having a given width W. The conveyor belt has a material delivery run of length L extending from a tail pulley to a head pulley and a return run of length L extending from the head pulley back to the head pulley. The conveyor belt cleaner comprises a cleaner blade formed of an elongated strip of flexible elastomer material having a predetermined thickness, a predetermined width W2 much smaller than L, and a length greater than W. The cleaner blade extends transversely of the conveyor belt. There are first and second fasteners affixed to the opposite ends of the cleaner blade. At least one tensioner, connected to the first fastener, applies a tensioning force longitudinally to the cleaner blade to maintain the cleaner blade in contact with the one surface of the conveyor belt.

In another aspect, the invention relates to a conveyor belt cleaner blade for cleaning one surface of a conveyor belt having a width W and length L, as in the preceding paragraph. The cleaner blade comprises an elongated strip of flexible elastomer material having a predetermined thickness, a predetermined width W2 much smaller than L, and a length greater than W. In use, the cleaner blade extends transversely of the conveyor belt. First and second fasteners are affixed to the opposite ends of the cleaner blade.

BRIEF DESCRIPTION OF THE DRAWINGS

FIG. 1 is a side elevation view, partly schematic, of a conveyor belt and a conveyor belt cleaner constructed in accordance with one embodiment of the invention;

FIG. 2 is a sectional elevation view of the conveyor belt and cleaner, taken approximately as indicated by line 2—2 in FIG. 1;

DESCRIPTION OF THE PREFERRED EMBODIMENTS

Figure 3:
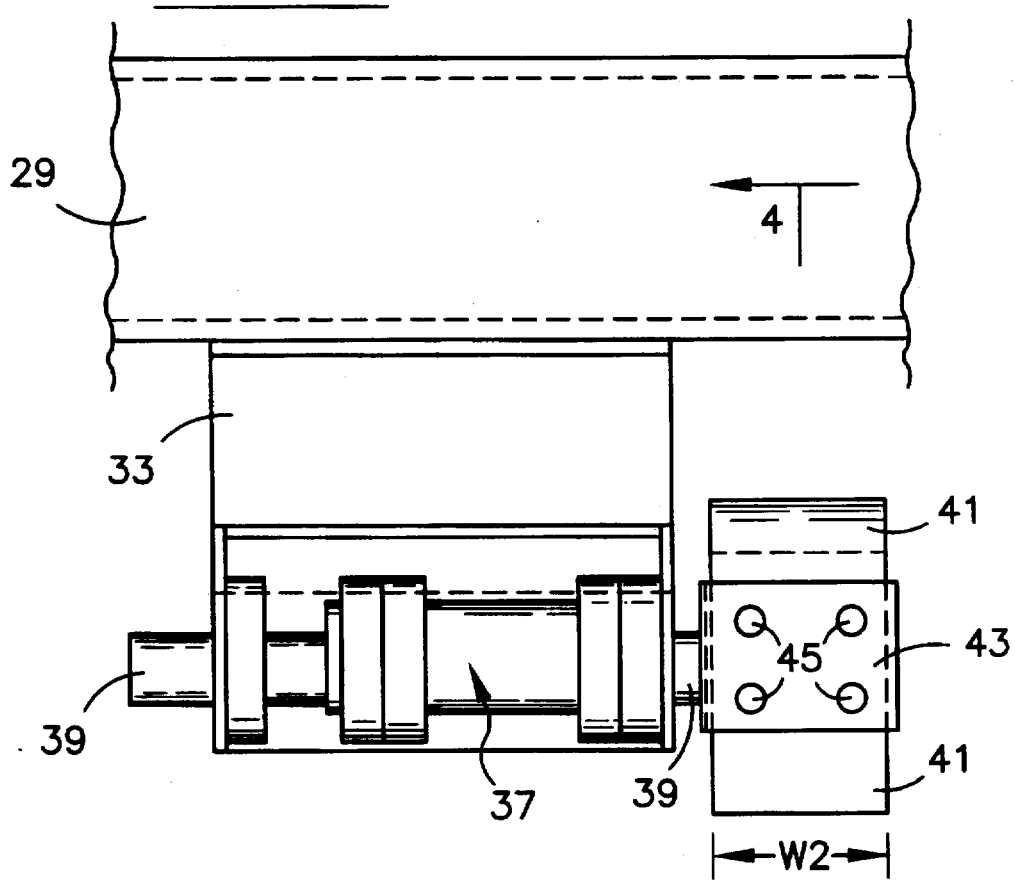
FIGS. 3 is a detail view, on an enlarged scale, that illustrates one end of the cleaner blade and the fastener that secures that end of the blade to a tensioner.

FIGS. 1 and 2 illustrate a conveyor belt cleaner 10 for cleaning one surface of a conveyor belt 21 of width W. Belt 21 is driven in the direction of the arrows A in FIG. 1. As shown in FIG. 1, conveyor belt 21 has a material delivery run 22 of length L that extends from a tail pulley 24 to a head pulley 25; a return run 23 of belt 21 extends from head pulley 25 back to tail pulley 24. As shown in FIG. 2, the return run 23 of belt 21, which has a width W, may be guided into generally V-shaped configuration by one or more pairs of rollers 26. The material delivery run 22 of the conveyor belt (FIG. 1) may also be generally V-shaped; in FIG. 1 run 22 is shown flat. Usually, the conveyor is driven from head pulley 25, whereas tail pulley 24 is usually an idler. A primary belt cleaner 12 having a blade 14 is customarily associated with the portion of conveyor belt 21 passing over head pulley 25. The primary belt cleaner 12 preferably has the construction and configuration disclosed in Gordon U.S. Pat. No. 5,222,589, but other primary belt cleaners may be used. The present invention is concerned primarily with the secondary belt cleaner 10 that cleans up any residue 27 clinging to the outer surface of the return run 23 of conveyor belt 21 after the conveyor belt passes primary cleaner 12.

Figure 4:
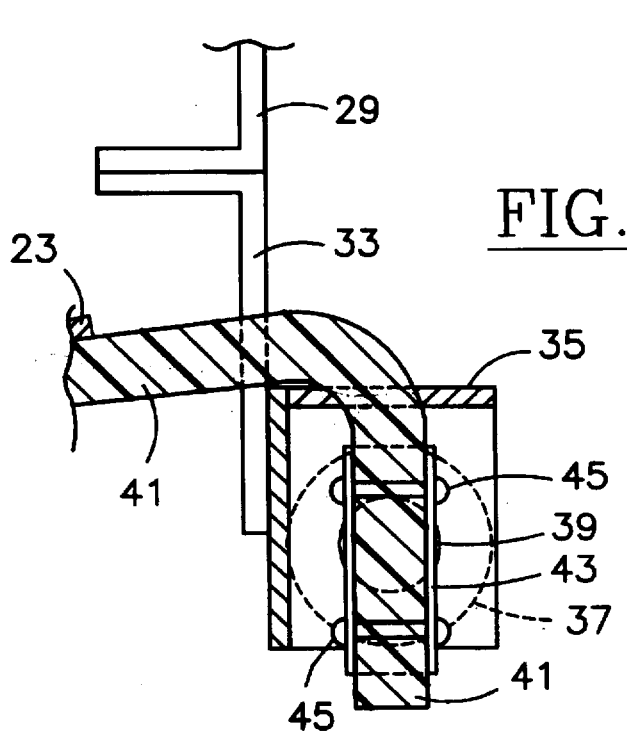
FIG. 4 is a detail view taken approximately along line 4—4 in FIG. 3.

The construction and operation of belt cleaner 10, embodying the present invention, can best be understood by reference to FIGS. 2–4. As shown in cross-section FIG. 2, the return run 23 of conveyor belt 21 is usually located between two fixed frame members 28 and 29. This is conventional practice. Frame members 28 and 29, and other fixed frame elements for the conveyor of belt 21 and pulleys 24 and 25, have been omitted in FIG. 1 for improved visualization.

Belt cleaner 10, FIG. 2, includes two support brackets 32 and 33 that are welded or otherwise affixed to frame members 28 and 29, respectively, on opposite sides of conveyor belt 21. Each of the two brackets 32 and 33 is of L-shaped configuration, and each has an integral portion that extends below the return run 23 of belt 21. A housing 34 is mounted on bracket 32 below conveyor belt 21; similarly, a housing 35 is mounted on bracket 33 below the conveyor belt. A rotary tensioner 36 having a shaft 38 is mounted in housing 34, as shown in FIG. 2. Another rotary tensioner 37 having a shaft 39 is mounted in the other housing 35; see FIGS. 2–4. The directions of tensioning for tensioners 37 and 38 is indicated in FIG. 2 by arrows B1 and B2.

Belt cleaner 10 comprises a cleaner blade 41 that extends across run 23 of conveyor belt 21, as shown in FIG. 2. Blade 41 is formed as an elongated strip of flexible material, preferably an elastomer such as rubber or urethane. The thickness of blade 41 is preferably constant, as shown in FIG. 3, but some thickness variation is permissible. Flexibility in blade 41 is more important than elasticity; it is highly desirable that the cleaner blade conform to the surface of conveyor belt 21, more specifically to the outer (lower) surface of the return run 23 of the conveyor belt in an installation like that shown in the drawings. Elasticity of cleaner blade 41 is desirable, particularly in installations for cleaning conveyor belts that include splices or other variations in thickness. Cleaner blade 41 has a predetermined width W2 (FIG. 3) much smaller than the overall conveyor belt length L (FIG. 1). Typically, the width W2 of blade 41 (FIG. 3) may be about four inches (ten cm) but is subject to appreciable variation. The overall length of the cleaner blade is appreciably greater than the conveyor belt width W; see FIG. 2.

Conveyor blade 41 has two U-shaped fasteners 42 and 43 affixed to its opposite ends; one of those fasteners, 43, is best shown in FIGS. 3 and 4. Each of the fasteners, such is fastener 43, is secured to one end of the blade, as by the four bolts 45 shown in FIG. 3. Two of the bolts 45 appear in FIG. 4. Other mounting arrangements to secure the fasteners 45 to the ends of cleaner blade 41 may be utilized; for example, two bolts may be sufficient, or other arrangements may be employed. Each fastener in the illustrated cleaner, which uses two tensioners 36 and 37 as described above, engages the shaft of one of the tensioners. The engagement of fastener 43 with the shaft 39 of tensioner 37 is shown in detail in FIGS. 3 and 4. When only one tensioner is utilized, that tensioner is preferably connected to the fastener 43 at one end of blade 41, as shown in FIG. 4. The other fastener at the opposite end of blade 41 is then affixed to a fixed frame member on the other side of the conveyor belt. That is, the other end of the belt may be affixed to the frame member 28, or to a bracket on the frame member.

The two rotary tensioners 36 and 37 maintain cleaner blade 41 in continuous contact with the full width of conveyor belt 21, as shown in FIG. 2. The two tensioners each apply a tensioning force longitudinally to the cleaner blade, as indicated by arrows B1 and B2 in FIG. 2. One tensioner would be sufficient in some installations. As previously noted, when only one tensioner is utilized, the tensioner is located at one end of cleaner blade 41 and the other end of the cleaner blade is anchored to a fixed frame member, such as one of the frame members 28 and 29.

Conveyor belt cleaner 10 is shown, in FIGS. 1 and 2, in position to clean the return run 23 of belt 21. It should be understood that cleaner 10 may be located at any desired position along the length L of the conveyor belt; the illustrated position is not critical. Moreover, a belt cleaner like cleaner 10 may be used to clean the other (upper) surface of the conveyor belt or may be positioned to clean the lower surface of the material delivery (conveyor) run 22 of belt 21. Of course, two or more cleaners 10 can be used at different locations on conveyor belt 21 if desired. The tensioners 36 and 37 shown in the drawings have the construction described in Gordon U.S. Pat. No. 4,533,036, but other tensioner devices, preferably resilient rotary tensioners, may be employed.

I claim:

1. A conveyor belt cleaner for cleaning one surface of a conveyor belt, the conveyor belt having a given width W, the conveyor belt having a material delivery run of length L extending from a tail pulley to a head pulley and a return run of length L extending from the head pulley back to the head pulley, the conveyor belt cleaner comprising:

a cleaner blade formed of an elongated strip of flexible elastomer material having a predetermined thickness, a predetermined width W2 much smaller than L, and a length greater than W, extending transversely of the conveyor belt;

first and second fasteners affixed to the opposite ends of the cleaner blade;

and at least one tensioner, connected to the first fastener, for applying a tensioning force longitudinally to the cleaner blade to maintain the cleaner blade in contact with the one surface of the conveyor belt.

2. A conveyor belt cleaner, according to claim 1, and further comprising:

a second tensioner, connected to the second fastener, for applying a second tensioning force longitudinally to the cleaner blade to aid the first tensioner in maintaining the cleaner blade in contact with the one surface of the conveyor belt.

3. A conveyor belt cleaner, according to claim 1, in which the second fastener is affixed to a frame for the conveyor belt.

4. A conveyor belt cleaner, according to claim 1, in which the tensioner is a rotary elastomeric tensioner device.

5. A conveyor belt cleaner, according to claim 1, in which the tensioner is a rotary elastomeric tensioner device mounted on a frame for the conveyor belt.

6. A conveyor belt cleaner blade for cleaning one surface of a conveyor belt having a width W and length L, as in claim 1, the cleaner blade comprising:

a cleaner blade formed of an elongated strip of flexible elastomer material having a predetermined thickness, a predetermined width W2 much smaller than L, and a length greater than W;

and first and second fasteners affixed to the opposite ends of the cleaner blade.

* * * * *